United States Patent [19]

Bradner

[11] 4,099,586

[45] Jul. 11, 1978

[54] WEIGHT INDICATOR

[76] Inventor: John H. Bradner, Iron Mountain Rd., Warwick, N.Y. 10990

[21] Appl. No.: 737,772

[22] Filed: Nov. 1, 1976

[51] Int. Cl.² .................. G01G 3/00; G01G 19/46
[52] U.S. Cl. .................................. 177/159; 177/225
[58] Field of Search ............... 177/159, 154, 167–170, 177/225, 231–233, 164, 184

[56] References Cited

U.S. PATENT DOCUMENTS

| 478,699 | 7/1892 | Kousky | 177/231 |
|---|---|---|---|
| 1,141,562 | 6/1915 | Law | 177/159 |
| 3,176,508 | 4/1965 | Ward | 177/184 X |
| 3,565,197 | 2/1971 | Carter | 177/232 X |
| 4,030,559 | 6/1977 | Fish | 177/159 |

*Primary Examiner*—Joseph W. Hartary

[57] ABSTRACT

A weight indicator comprises an open top casing containing a resilient column, a relatively rigid pad extending across the top of the column and a scale mechanism for indicating vertical compression of the column in response to weight applied downwardly on the pad, a frictionally mounted indicator element on the casing being movable along a graduated scale on the casing and there being a projection on the pad for displacing the indicator element along the scale as the column reduces in height in response to said downwardly applied weight.

5 Claims, 5 Drawing Figures

WEIGHT INDICATOR

There exists today widespread interest in individual weight control primarily as a health matter but also for social and appearance considerations.

Of particular interest especially to individuals on voluntary or prescribed diets is their weight trend, and the present invention deals with the provision of a relatively simple, compact inexpensive but reliable portable device whereby weight trends may be quickly checked without the need to seek out the usual bathroom and like bulky scales.

So-called weight control guides are known, as evidenced by U.S. Pat. No. 3,565,197 and the patents mentioned therein, but these are mainly relatively bulky or heavy and sometimes complex devices.

The present invention provides for the first time a compact, light weight portable weight trend indicator of novel construction that may even be carried around in a hand bag or the like and this is the major object of the invention.

More specifically it is an important object of the invention to provide a simple compact weight indicator comprising a deflectable column of resilient material cooperating with a resettable scale mechanism having a pointer or like indicator element that moves over a scale and temporarily retains a displaced position corresponding to the applied weight on the column.

A further object of the invention is to provide a novel weight indicator wherein a resilient column of rubber or the like may compress to reduced height under applied weight and a projection on the column engages a frictionally mounted resettable scale pointer to displace it over the scale in proportion to the applied weight, the friction mounting of the pointer retaining it for the time being in the displaced location so that the user may study the indication and then reset the pointer to an initial value ready for the next use of the device.

Further objects will appear as the description proceeds in association with the appended claims and the annexed drawings.

PREFERRED EMBODIMENTS

Figure 2:
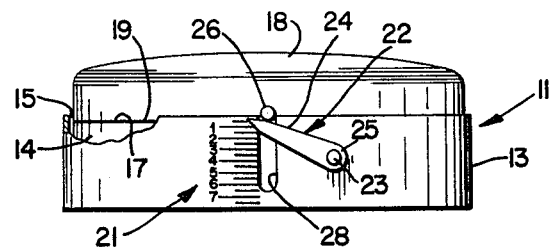
FIG. 2 is a side elevation partially broken away and sectioned.

A rigid open top casing 11, which may be of metal or a stiff synthetic plastic, has a flat bottom wall 12 and a continuous upright side wall 13.

Casing 11 is relatively shallow and contains a body 14 of resilient material such as an integral block of rubber, synthetic or natural. Where the casing has a cylindrical side wall 13, the resilient body may be an integral disc of rubber providing a cylindrical column of uniform height whose peripheral diameter is such that an annular space 15 is provided between the disc and wall 13.

Disc 14 has a flat bottom surface that is preferably adhesively secured as by an adhesive layer 16 to the casing bottom wall. Disc 14 preferably has a flat top surface 17 parallel to wall 12 that is approximately coplanar with the top edge of wall 13 or may be slightly below that edge.

A relatively rigid pad 18 is mounted on top surface 17 of disc 14, and a layer of adhesive 19 fixes the pad against displacement from the disc. Pad 18 extends over the entire area of surface 17, preferably having the same peripheral extend as the resilient column so that downward pressure applied to pad 18 will be substantially uniformly distributed across the resilient column.

Preferably pad 18 is an integral element of hard plastic such as a sheet of vinyl plastic, and as shown the upper surface may be rounded and free of sharp edges or projections.

In some embodiments the pad may be the locally hardened integral upper transverse section of an integral disc of resilient silicone rubber or the like.

The outer surface of side wall 13 contains an indicator. A scale 21 is marked on the surface, and a light weight pointer 22 for the scale is pivotally mounted on a cylindrical stud 23 secured as by riveting to wall 13. Pointer 22 comprises an element 24 having at one end a hub 25 mounted with a light friction fit on stud 23. The friction fit mount of hub 25 on stud 23 is such that the pointer may be readily rotatably adjusted and displaced with respect to scale 21, and will maintain the adjusted or displaced position after the force applied for adjustment or displacement is removed.

Figure 1:
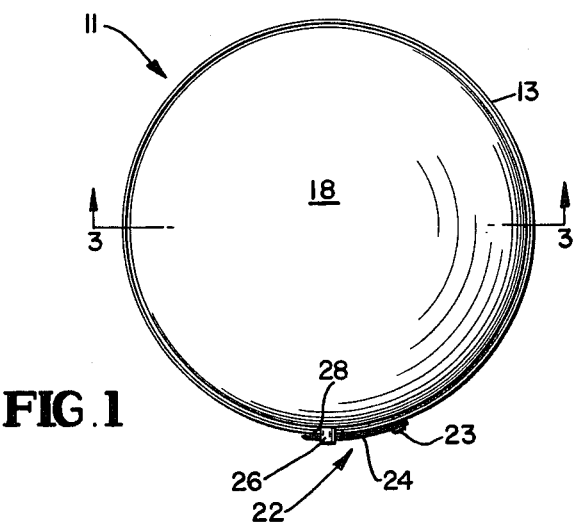
FIG. 1 is a top plan view showing the invention in a preferred embodiment.
Figure 3:
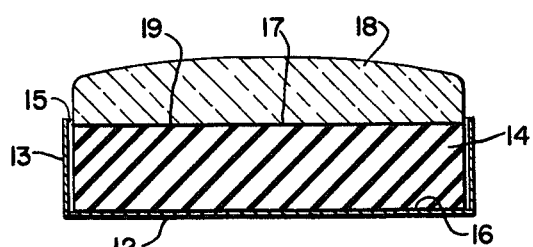
FIG. 3 is a section substantially on line 3—3 of FIG. 1.

As shown in FIG. 1 the pointer element extends over the scale beneath a projection 26 fixed to pad 18. Projection 26 may be any rigid pin or the like and may even be a rigid integral projection or like extending from pad 18.

Figure 4:
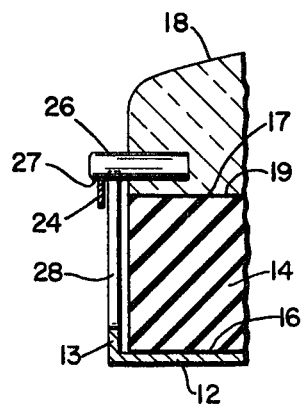
FIG. 4 is a fragmentary view in section showing indicator detail.
Figure 5:
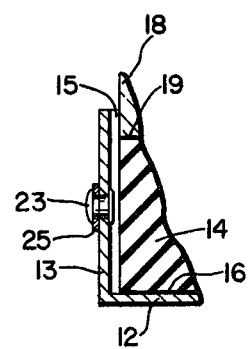
FIG. 5 is another fragmentary view in section showing the indicator pointer mounting.

Referring to FIG. 4 the edge 27 of projection 26 is so located that it is in substantial contact with the pointer when the pointer is in the initial zero indicating position of FIG. 2. As shown in FIG. 2 the casing side wall is provided with an upwardly open slot 28 that permits free displacement of projection 26.

In use the pointer is adjustably set at zero on the scale, at which time the pointer is in or very near contact with projection 26. The casing is placed on a flat surface, such as a floor, and the weight to be indicated applied to pad 18. The individual does this by momentarily standing on the ball of one foot on pad 18. The downwardly applied force due to the weight will vertically compress the resilient column, and as the column reduces in height projection 26 will displace pointer 22 about its pivot to assume and maintain a new indicating position relative to the scale. When the weight is removed the column reexpands vertically and projection 26 rises, but pointer 22 remains in the new indicator position. The user may pick up the device and note and record the new position.

The space 15 is sufficient in radial extent that it will not interfere with radial expansion of the column as the weight force is applied. The column is relatively shallow in height so that there is little or no danger of tilting in use.

The disc 14 is preferably made of a rubber having a durometer hardness of about 20–40. The scale 21 may be arbitrarily graduated or may be calibrated to correspond to deflection of the resilient column in response to applied weights.

The device is compact and light in weight. There is only one movable mechanical part, the pointer. There are no springs to rust or collect dirt. Synthetic rubber is preferred for disc 14 because it does not harden appreciably with age. There is no need to accurately calibrate in pounds or kilograms, as the arbitrary scale indications will show the user instantly whether weight is increasing or decreasing, so that for these purposes the device is quite reliable.

The invention provides an arrangement that indicates and measures maximum deflection during each operation. In some embodiments the resilient column may be replaced by suitable metal or plastic spring means that reduce in height in proportion to applied weight.

While the preferred application of the invention is in weight trend indicator devices such as disclosed, the principles of the invention may be applied in other fields.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An individual portable weight indicating apparatus comprising an open top casing having a continuous side wall arising from a flat bottomed base and containing resilient means in the form of a solid column of elastomeric material fixed on said base and freely surrounded by said side wall, a relatively stiff weight application pad extending fixedly across the top of said column at the open top of the casing, the upper surface of said pad being adapted to support the weight of an individual standing on the apparatus and means for indicating vertical compression of said column in response to weight applied directly downwardly on the pad comprising an indicator member on the casing movable along an external scale on the casing, means on the pad for engaging and displacing said member downwardly along the scale as the column reduces in height in response to said downwardly applied weight, and means for maintaining said indicator member in the position of maximum downward deflection.

2. Weight indicating apparatus as defined in claim 1, wherein said indicator member is a frictionally mounted pivotal pointer capable of maintaining a displaced position after removal of the weight from the pad and a projection on said pad engageable with said pointer.

3. Weight indicating apparatus as defined in claim 2, wherein said projection of the pad extends laterally through a longitudinal slot in the casing side wall, and a scale cooperating with said pointer is marked along a slot edge.

4. Weight indicating apparatus as defined in claim 1, wherein said pad is an integral hard plastic member affixed over the upper surface of said column.

5. Weight indicating apparatus as defined in claim 4, wherein said column is a disc of rubber bonded to the bottom of said casing and said pad is a relatively stiff synthetic plastic member bonded to said disc.

* * * * *